United States Patent [19]

Tanaka et al.

[11] Patent Number: 5,185,746
[45] Date of Patent: Feb. 9, 1993

[54] OPTICAL RECORDING SYSTEM WITH ERROR CORRECTION AND DATA RECORDING DISTRIBUTED ACROSS MULTIPLE DISK DRIVES

[75] Inventors: Kunimaro Tanaka; Minoru Ozaki; Yoshihiro Kiyose; Osamu Ito, all of Amagasaki, Japan

[73] Assignee: Mitsubishi Denki Kabushiki Kaisha, Japan

[21] Appl. No.: 509,635

[22] Filed: Apr. 13, 1990

[30] Foreign Application Priority Data

Apr. 14, 1989 [JP] Japan .................. 1-95676
May 12, 1989 [JP] Japan .................. 1-119206
May 12, 1989 [JP] Japan .................. 1-119213

[51] Int. Cl.$^5$ .......................................... H03M 13/00
[52] U.S. Cl. .......................... 371/40.1; 371/40.3; 371/40.2; 371/40.4; 360/22
[58] Field of Search ................. 371/40.1, 40.2, 40.3, 371/40.4, 21.1, 21.6; 369/54; 360/22, 61, 47, 53

[56] References Cited

U.S. PATENT DOCUMENTS

| | | | |
|---|---|---|---|
| 4,092,732 | 5/1978 | Ouchi ........................... | 364/900 |
| 4,336,612 | 6/1982 | Inoue et al. ................... | 371/39.1 |
| 4,562,577 | 12/1985 | Glover et al. ................. | 371/40.1 |
| 4,633,471 | 12/1986 | Perera et al. .................. | 371/38.1 |
| 4,733,396 | 3/1988 | Baldwin et al. ................ | 371/40.1 |
| 4,761,785 | 8/1988 | Clark et al. ................... | 371/51.1 |
| 4,914,656 | 4/1990 | Dunphy, Jr. et al. .......... | 371/10.2 |
| 5,077,736 | 12/1991 | Dunphy, Jr. et al. .......... | 371/10.1 |

OTHER PUBLICATIONS

"A New Class of Burst-Error-Correcting Codes and its Application to PCM Tape Recording System", Conference Record, 1978 National Telecommunications Conference; pp. 20.6.2–20.6.5.

NE Report, Nikkei Electronics; Dec. 28, 1987 (No. 437) pp. 48–49 (English Language Translation).

Primary Examiner—Robert W. Beausoliel
Assistant Examiner—Ly V. Hua
Attorney, Agent, or Firm—Wolf, Greenfield & Sacks

[57] ABSTRACT

An optical recording system which separates and records data on optical disks loaded respectively in a plurality of optical disk drives, check symbol of the data to be recorded being recorded on predetermined disks. Information about bad recording or lost data, which caused by the trouble of the optical disk drive, is memorized, and data to be recorded is reproduced by normally recorded and reproduced data, said check symbol and said information.

28 Claims, 18 Drawing Sheets

Fig. 14

| | | |
|---|---|---|
| OPTICAL DISK ① | FIRST BLOCK | $a_1$ |
| OPTICAL DISK ② | SECOND BLOCK | $a_2$ |
| OPTICAL DISK ③ | THIRD BLOCK | $a_3$ |
| OPTICAL DISK ④ | FOURTH BLOCK | $a_4$ |
| OPTICAL DISK ⑤ | FIFTH BLOCK | $a_5$ |
| OPTICAL DISK ⑥ | SIXTH BLOCK | $a_6$ |
| OPTICAL DISK ⑦ | SEVENTH BLOCK | $a_7$ |
| OPTICAL DISK ⑧ | EIGHTH BLOCK | $a_8$ |
| OPTICAL DISK ⑨ | P | $a_9$ |
| OPTICAL DISK ⑩ | Q | $a_{10}$ |
| OPTICAL DISK ⑪ | R | $a_{11}$ |
| OPTICAL DISK ⑫ | S | $a_{12}$ |

OPTICAL RECORDING SYSTEM WITH ERROR CORRECTION AND DATA RECORDING DISTRIBUTED ACROSS MULTIPLE DISK DRIVES

BACKGROUND OF THE INVENTION

1. Field of the Invention

The present invention relates to an optical recording system using optical disks (including opto magnetic disks) as a recording medium.

2. Description of Related Art

Some magnetic disks have achieved high-speed transmission rates by synchronously rotating a plurality of disk drives. For example, a system is shown in the Nikkei Electronics, page 48, Dec. 28, 1987.

On the other hand, the optical disk has been put in practical use as a large-capacity information recording medium. An array-type optical recording system has been developed wherein, to utilize the characteristics of this disk more effectively, a plurality of disk drives are combined, and are operated just like one large capacity disk driving system. In such a conventional large-capacity optical recording system, it is indispensable to consider a counterplan when a part of optical disk drives is in trouble.

SUMMARY OF THE INVENTION

The present invention has been devised to solve such a problem. The primary object of the present invention is to provide an optical recording system which is capable of carrying out operation without difficulty if a part of the optical disk drives is in trouble by separating data and recording each separated data to a plurality of optical disks, by recording check symbol of an error correction code to a part of optical disks, and by recording information about vanishment of data caused by a trouble of the optical disk drive.

Another object of the invention is to provide an optical recording system which is capable of carrying out the operation without stopping if a part of the optical disk drives is in trouble.

Still another object of the invention is to provide an optical disk system which is capable of restoring the data (or reproducing correctly) at the time of reproducing even when the recording is carried out with a part of the optical disk drive being in trouble, and is capable of recording the data to be recorded originally to the optical disk which is loaded in the troubled optical disk drive, when the trouble is settled.

When any one of the optical disk drives is in trouble, recording is not carried out to the disk being loaded therein. In such a case, data to be loaded is vanished. Hereupon, the information about the trouble is stored by a proper means. When aforesaid optical disk drive is restored a state that recording is possible, vanished data is restored by aforesaid stored information and check symbol and/or recorded data, the restored data being recorded to a corresponding address of the corresponding disk. Thereby data recording is completed.

The above and further objects and features of the invention will more fully be apparent from the following detailed description with accompanying drawings.

BRIEF DESCRIPTION OF THE DRAWINGS

FIG. 14 is an explanatory drawing of a recording system of the same.

DESCRIPTION OF THE PREFERRED EMBODIMENTS

Hereinafter, detailed description is made on the present invention based on drawings showing embodiments thereof.

Figure 1:
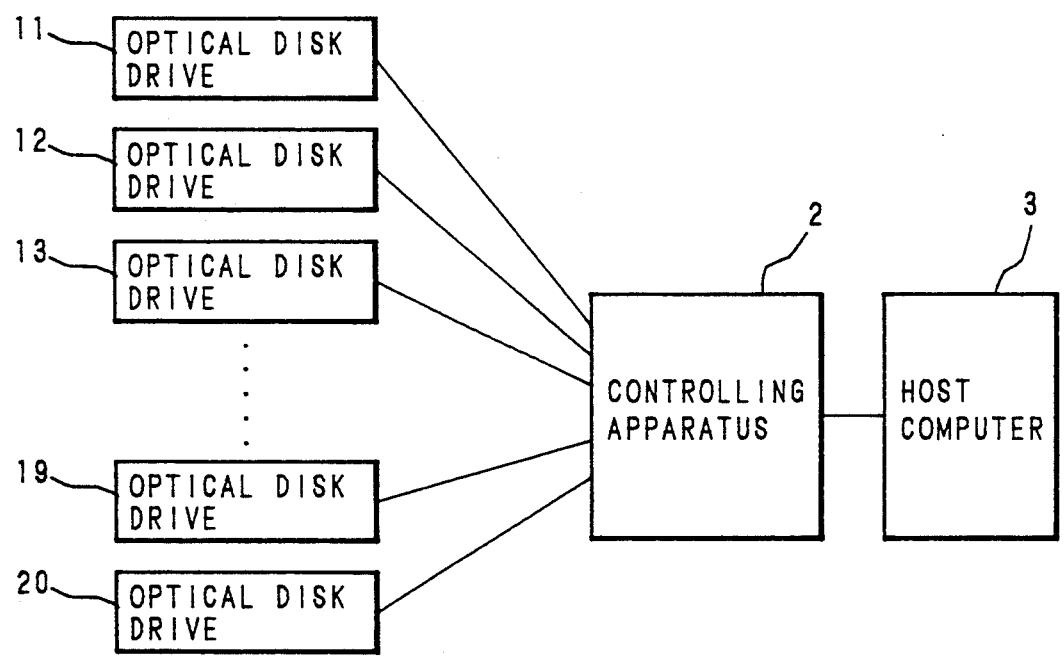
FIG. 1 is a block diagram of the optical recording system of the present invention.

FIG. 1 is a block diagram of an embodiment of an optical recording system of the present invention.

In FIG. 1, numerals 11, 12 . . . 20 designate optical disk drives, which are coupled to a controlling apparatus 2 and receive data therefrom to be recorded on optical disks loaded within the optical disk drives and source data thereto reproduced from the optical disk. Numeral 3 designates a host computer, which gives data to be recorded to the controlling apparatus 2, or directs reproduction of the data.

Figure 2:
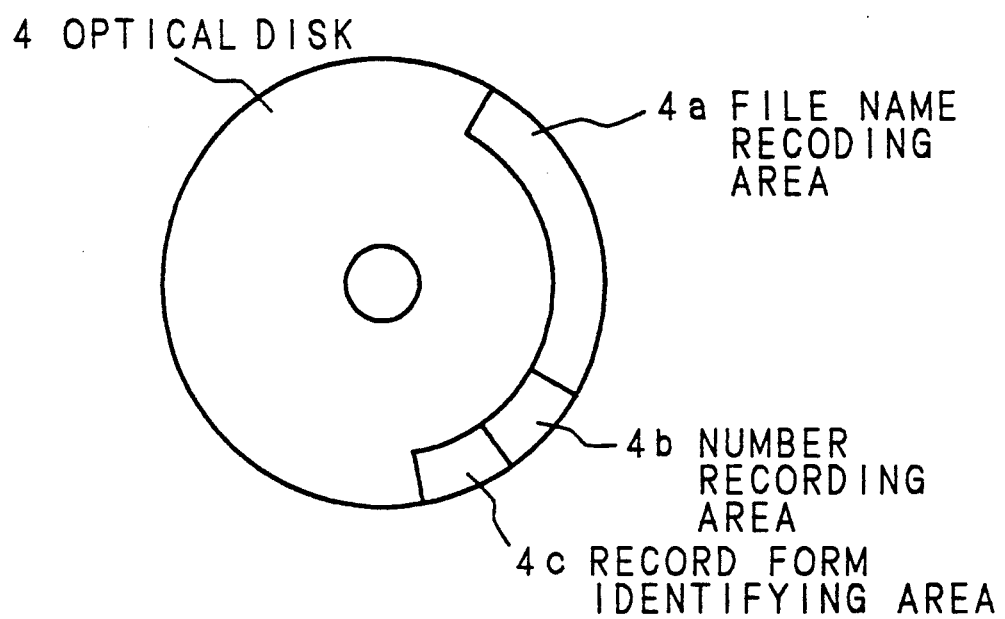
FIG. 2 is an explanatory drawing of a format of an optical disk.

FIG. 2 shows an abstract of a record format of an optical disk 4, which is provided with a file name recording area 4a for recording information identifying a data file constituted with recorded data, a number recording area 4b for recording the identifying number of optical disk and a record form identifying area 4c.

The method of numbering the optical disk may be a method wherein the same number exists by only one in the whole system, or may be a method wherein the same number exists in a plural number.

The record form identifying area 4c can utilize the whole recording area of the disk if the optical disk is used as a large-capacity recording medium. However, when used in this mode, the speed of recording and reproduction is relatively low. Alternatively, the record form identifying area 4c can use only part of the recording area when the optical disk is used as a small-capacity recording medium. Although the capacity of the disk is reduced in this manner, the speed of recording and reproduction has increased.

In the optical disk recording, by recording data on the whole surface of the disk, the recording capacity per one sheet becomes large, but all tracks are required to be sought, and the seeking time becomes long. On the other hand, where only part of the tracks are used, the distance of seeking becomes short, and therefore the seeking time becomes short although the recording capacity per one sheet becomes small. Codes for identifying these recording modes are recorded in the record form identifying area 4c.

Then, in this system, on the optical disk whereon specific numbers, for example, 9 and 10 are recorded in the number recording area 4b, only check data produced from the data recorded on the other optical disks, that is, only check symbols of an error correction code are recorded.

Operation of the optical recording system of the present invention as described above is as follows. The operation differs depending on whether or not the file name recording area 4a, the number recording area 4b and the record form identifying area 4c are recorded in advance. Where these areas 4a-4c are not recorded in advance, an ID part is recorded in formatting the optical disk. The ID part is information identifying a plurality of sets of optical disks, and the record thereof is performed, for example, at the file name recording area 4a. Description is made assuming that the ID part is already recorded. First, before starting the system, the optical disks 4 are loaded in the optical disk drives 11, 12 . . . . In this case, any of the optical disks may be loaded in any of the optical disk drives 11, 12 . . . . By starting the system, the controlling apparatus 2 reads the contents of the file name recording area 4a, the number recording area 4b and the record form identifying area 4c. The host computer 3 judges whether or not the optical disk matching with the purpose of the use has been selected and loaded from the content of the file name recording area 4a.

On the other hand, from the content of the number recording area 4b the controlling apparatus 2 judges which number of optical disk 4 has been loaded in which of the optical disk drives 11, 12 . . . .

Figure 3:
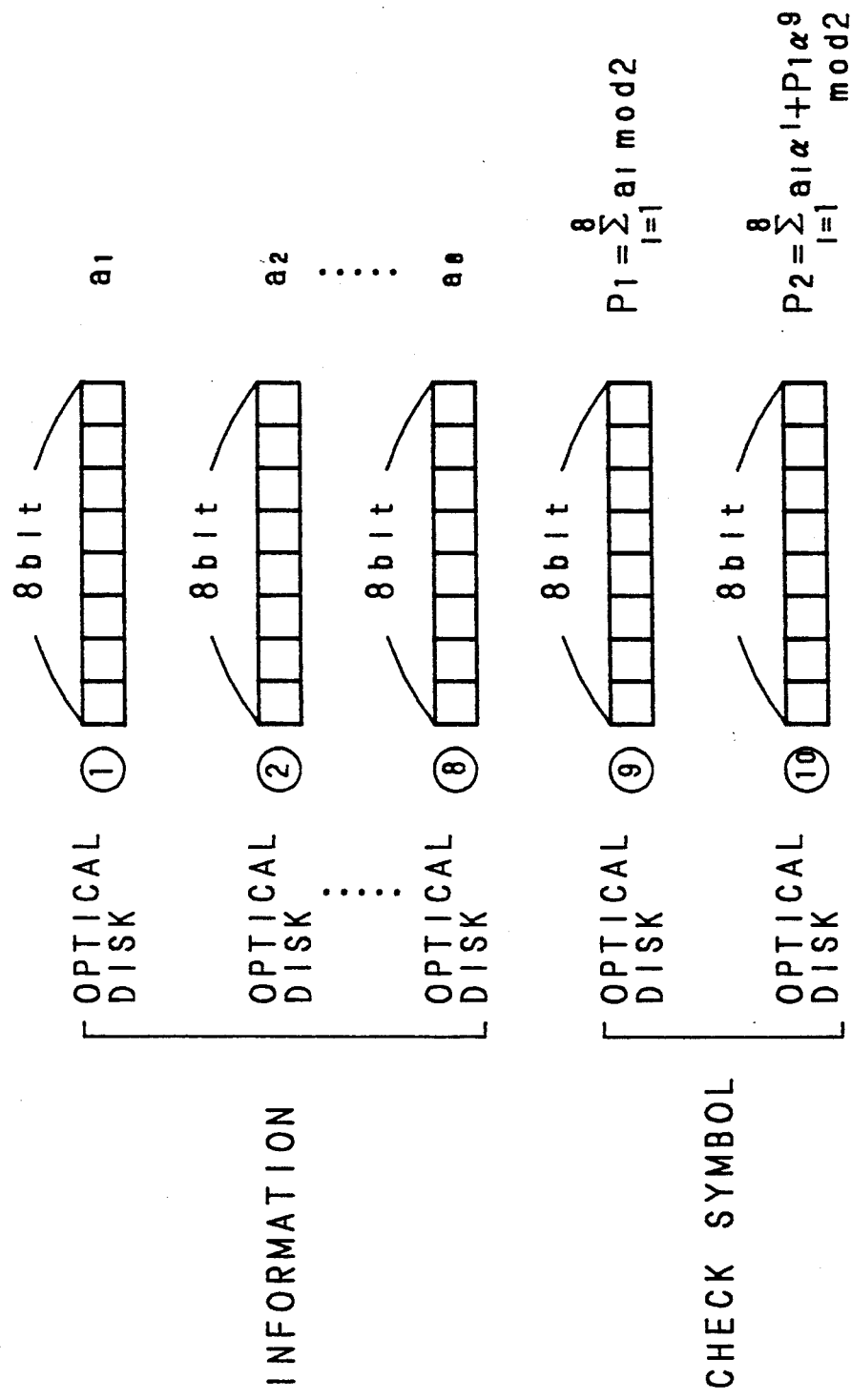
FIG. 3 is an explanatory drawing of check symbols.

In addition, as described later, based on the rule of producing check symbols of an error correction code and the check symbols reproduced from the optical disk, the optical disk loaded in each of the optical disk drives 11, 12, . . . can be identified. Where 10 units of optical disk drives are installed as is the case with this embodiment, eight units are assigned to the disk drives for recording and reproducing information, and two units are assigned to the disk drives for recording and reproducing check symbols. Note that the disk drives for recording and reproducing information and check symbols are not installed in a fixed manner, but can operate as a drive for information or operate as a drive for check symbols depending on the disk loaded therein. An error correcting method using Reed-Solomon code is known (see FIG. 3). This means that eight bits of data recorded on each of the optical disks of No. 1–No. 8 are taken as one unit, and this is represented as $a_i$ ($i=1-8$), and an element of GF ($2^8$) is represented as $\alpha_i$, and the following parities $P_1$ and $P_2$ are calculated.

$$P_1 = \sum_{i=1}^{8} a_i \, mod2 \tag{1}$$

$$P_2 = \sum_{i=1}^{8} a_i\alpha_i + P_1\alpha_9 \quad mod2 \tag{2}$$

These $P_1$ and $P_2$ are recorded on the optical disks of No. 9 and No. 10, respectively. This means that the check symbols $P_1$ and $P_2$ of this error correction code are constituted across a plurality of optical disks, and the Hamming distance between them is 3. In other words, two optical disks are installed for recording the check symbols $P_1$ and $P_2$, respectively.

Correspondence between the disk drive performing record or reproduction and the optical disk can be identified also by this error correction. That is, it is assumed that in the stage that the optical disk is loaded, each optical disk is loaded in each optical disk drive set in advance. Next, a power of $\alpha$ is made based on the assumed relationship between the optical disk and the optical disk drive, and thereby error correction (as described later) is made. However, where the loaded state of the actual optical disk differs from that of the assumed one, error correction cannot be made, and syndromes are set. When the syndromes are set, another loaded state is assumed, and error correction is made again. Thus, the assumption of the loaded state is sequentially changed, and the same processing is repeated until the correct state is encountered. Thus, the correct loaded state of the optical disk can be found. By doing in such a manner, the number of the optical disk can be identified without installing the number recording area 4b.

Figure 4:
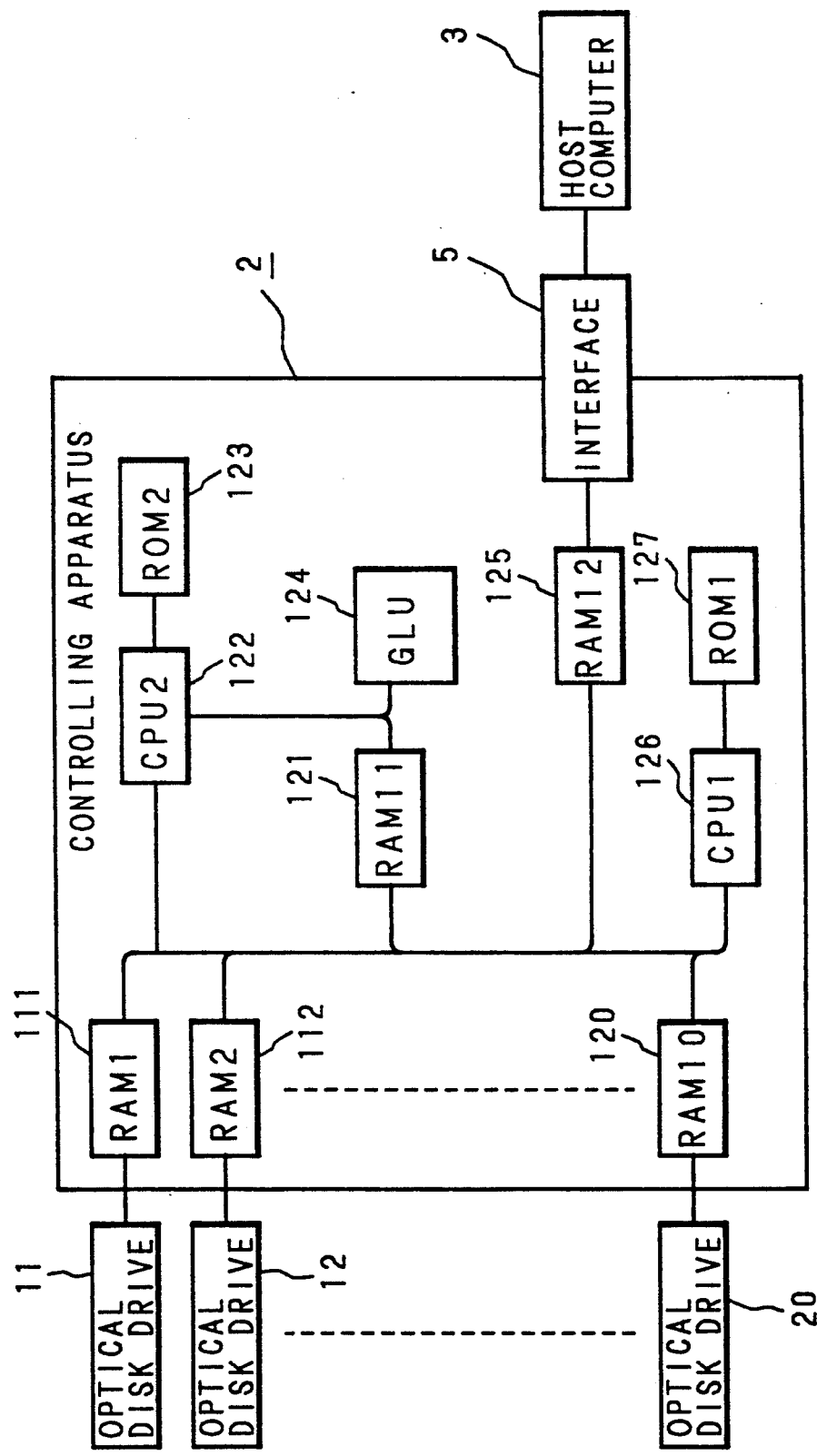
FIG. 4 is a block diagram of a controlling apparatus.

FIG. 4 is a block diagram showing an example of the controlling apparatus 2. The controlling apparatus 2 is provided with buffer RAMs (RAM1 111, RAM2 112, . . . RAM 10 120) for the respective optical disk drive, and data to be recorded by the respective optical disk drives 11, 12 . . . are stored once here, and are thereafter transferred to the respective optical disk drives, and in reproduction, the data reproduced by the respective optical disk drives 11, 12 . . . are stored once here.

Encoding and decoding of the error correct code are performed by another RAM (RAM11 121), a central processing unit CPU 2 122, a read-only memory ROM 2 123 and a Galois logic unit GLU 124. Data to be encoded and decoded are stored in the RAM 11 121 once, thereafter being operated using the Galois logic unit GLU 124. Control of the operation is performed by the central processing unit CPU 2 122.

The firmware for control and the power of $\alpha$ are stored in advance in the read-only memory ROM 2 123. Giving and receiving of data to and from the host computer 3 are performed through an interface 5. Data from the host computer 3 is stored once in another RAM (RAM 12 125), then being transferred to a RAM 11 121. In reverse, when the reproduced data is transferred to the host computer 3, the data is stored once, then being transferred to the host computer 3. These controls are performed by another central controlling unit CPU 1 126, and the firmware for these controls is stored in advance in a read-only memory ROM 1 127.

In the system of the present invention as described above, where the data given from the host computer 3 is recorded, the controlling apparatus 2 adds the check data to the data inputted from the host computer 3 using the central processing unit CPU 2 122, RAM 11 121 and the Galois logic unit GLU 124, sends the data to the optical disk drives 11, 12 . . . , and sends out control signals required for controlling the optical disk drives 11, 12 . . . . At this time, identifying of the optical disk drive whereto the data is to be sent is made by the recorded data in the number recording area 4b or the above-described method of repeating error correction.

The optical disk drives 11, 12 . . . record the data sent out in such a manner on the optical disks thereof.

On the other hand, in reproduction, according to the direction from the host computer 3, the controlling unit 2 sends a signal directing reproduction and a signal of the physical address or a logical address of the position where the data to be reproduced is recorded to the optical disk drives 11, 12 . . . wherein the appropriate optical disks 4 are loaded. Thereby, the required data is reproduced.

Next, description is made on the data recording system of the system of the present invention in contrast with the conventional system. In the conventional optical disk, a data is recorded in a predetermined sector, and thereafter this is reproduced for data check. Where the difference between the data to be recorded and the reproduced data exceeds a predetermined criterion, the data is recorded again in a reserve sector preliminary provided for each track, that is, an alternate sector. The record into this alternate sector is reproduced and checked again, and where many errors exist also in this record, the data is recorded further again into a reserve track preliminary provided, that is, an alternate track.

On the other hand, in the system of the present invention, the check data is recorded in one or a plurality of specific optical disks, and it is possible not to reserve the above-described alternate sector, alternate track or the like.

Figure 5:
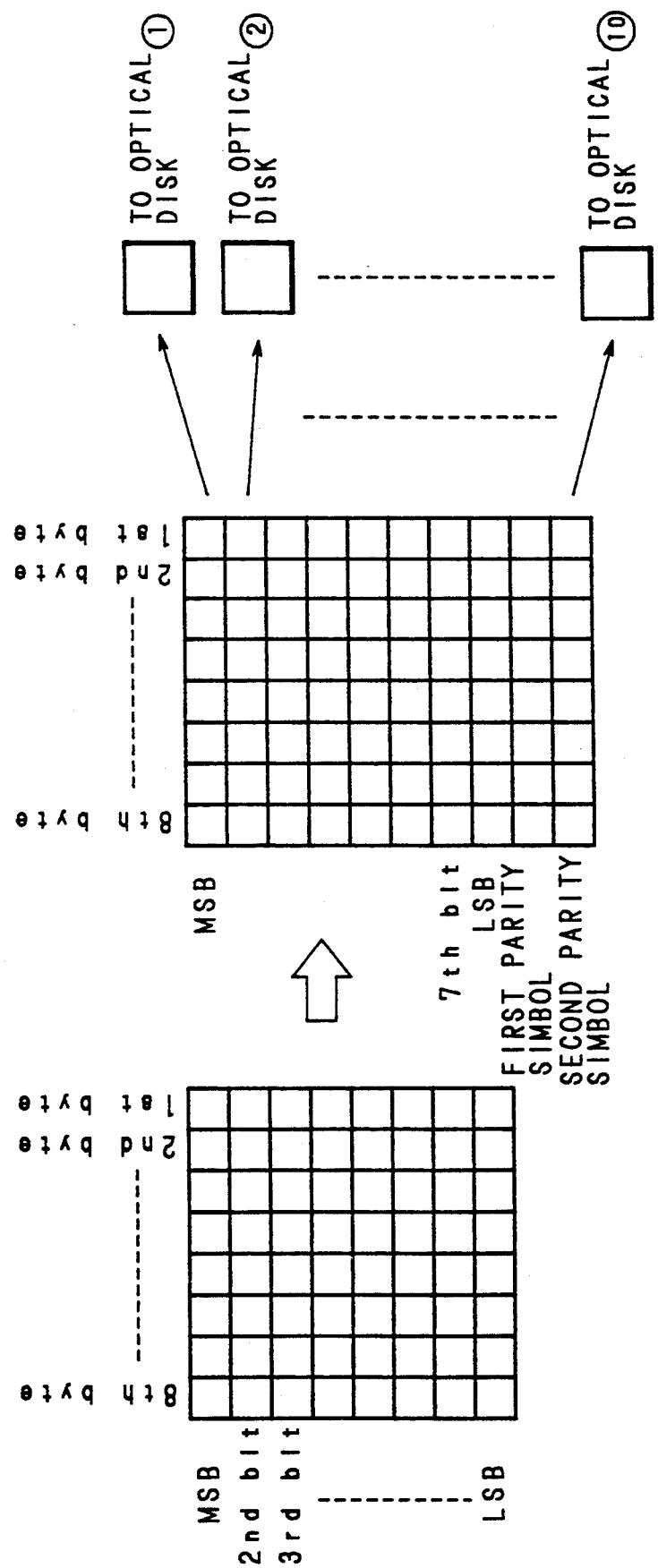
FIG. 5 is an explanatory drawing of data separation and recording.

FIG. 5 shows an example of a recording system. In the example, a unit of recording is 8 byte, and interleave of data is carried out at the time of recording. Ten units of optical disk drives are used, two of them being used for recording check symbols.

FIG. 5 shows an example of a recording system which interleaves eight bytes data taken as a record unit. As shown in FIG. 5(a), it is assumed that data of eight bits (one byte), MSB - LSB exist from the first byte to the eighth byte. Then, as shown in FIG. 5(b), two parity symbols (the first parity symbol and the second parity symbol) are made on a byte basis. These symbols are made based on the above-mentioned equations (1) and (2). All of MSBs of these first-eighth bytes are sent to the optical disk drive wherein the optical disk 4 recorded the number ① is loaded. All of data of the second bits of the first-eighth bytes are sent simultaneously to the optical disk drive wherein the optical disk 4 recorded the number ② is loaded. Subsequently, like the above, data of the first-eighth bytes are sent to the optical disk drive wherein the optical disk recorded each number is loaded.

Then, each data of eight bits of the first parity symbol and the second parity symbol is sent to the optical disk drive wherein the optical disk of the number ⑨ or 10 is loaded. The data sent to each optical disk drive is recorded on the optical disk loaded therein, respectively. The record onto each optical disk may be performed at the same address or at a different address.

Figure 6:
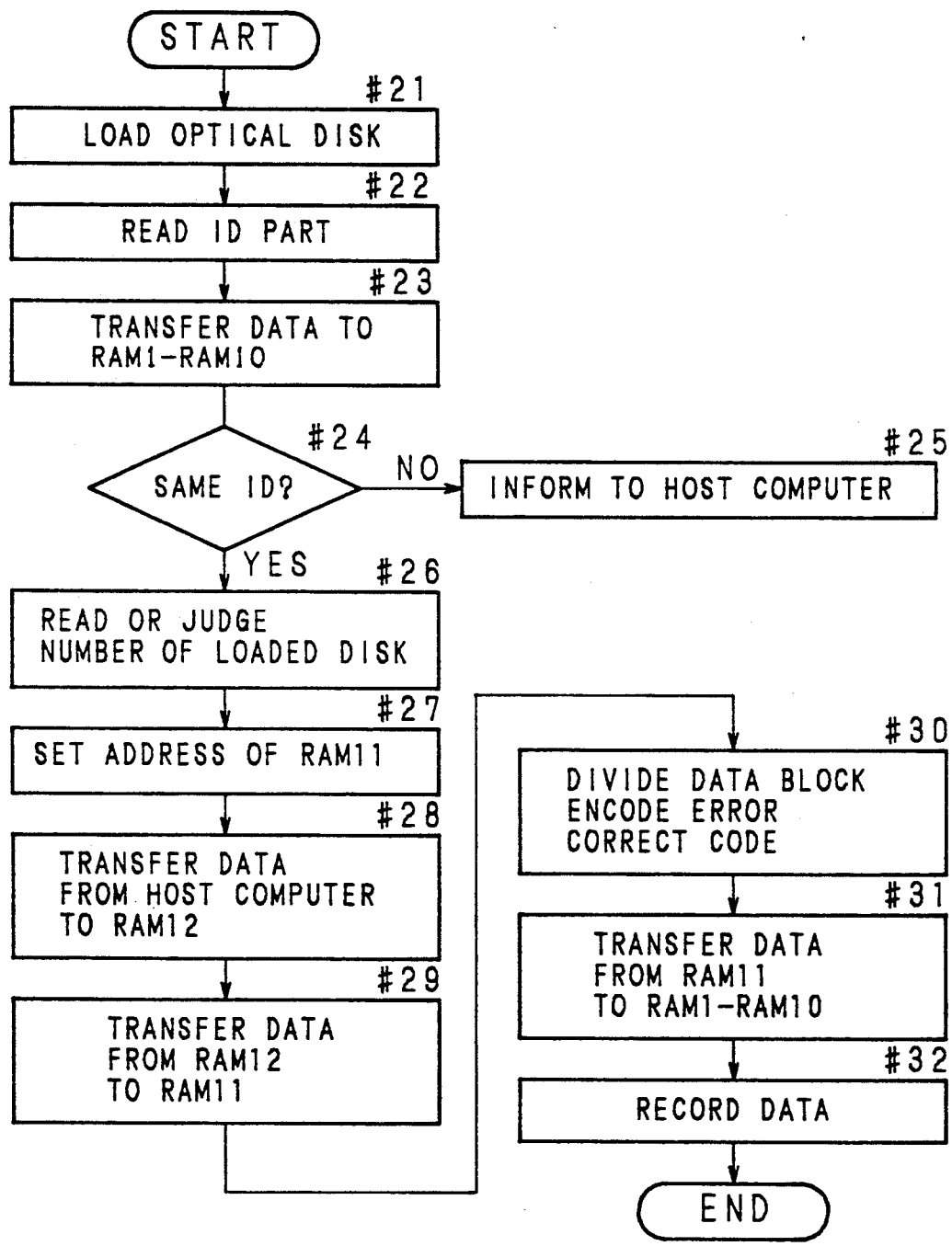
FIG. 6 is a flow chart of processing procedures in recording data.

FIG. 6 is a flow chart of processing procedure in data recording. When the optical disks are loaded (#21) and the optical disk drives 11, 12 . . . are started up, first, read of the ID part by the respective disk drives 11, 12 . . . is performed (#22). The read data are transferred to the RAM 1-RAM 10 (#23). The central processing unit CPU 1 checks this ID part (#24), and in the case of being not the same, it informs the host computer 3 of this (#25). In the case of the same, it reads or judges the number of the optical disk loaded in each of the optical disk drives 11, 12 . . . (#26).

Figure 7:
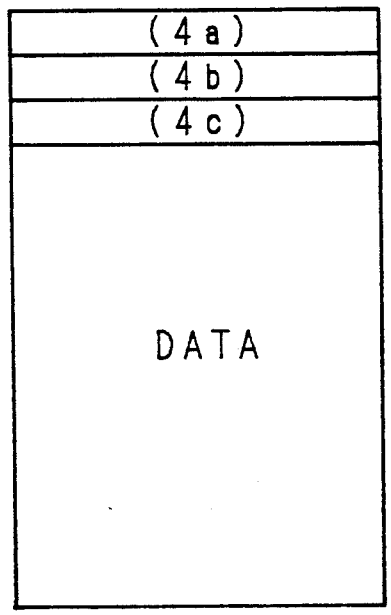
FIG. 7 is a memory map of RAM 1 through RAM 10.

FIG. 7 is a drawing showing a data storing area of each of the RAM 1-RAM 10. Besides the area for storing data, areas for storing identification data read from the file name recording area 4a, the number recording area 4b and the record form identifying area 4c are installed (in the drawing, 4a, 4b, and 4c are affixed). At the point when the optical disk is loaded, the optical disk drive reproduces the identification data, and transfers it to the RAM 1-RAM 10. The central processing unit CPU 1 126 reads the identification data stored in the identification data areas in the RAM1-RAM10, and judges that which optical disk has been loaded in which optical disk drive.

Data to be recorded on the optical disks loaded in 10 optical disk drives 11, 12 . . . are stored once in the RAM 11 121, and then divided as described above, and the check symbols are calculated and moved to the RAM1-RAM10. The RAM1-RAM10 are allocated to 10 optical disk drives, respectively. On the other hand, storage in the RAM11 is performed according to addresses allocated to 10 optical disks. Accordingly, when the optical disk loaded in each optical disk drive is identified, the address of the RAM11 storing the data to be transferred to the respective RAM1-RAM10 is set (#27). After this setting, the data to be recorded from the host computer 3 is transferred to the RAM12 (#28). Further, this is transferred to the RAM11 (#29), and the data block is divided using the central processing unit CPU 112 and the error correction code is encoded for the data stored in the RAM11 using the Galois logic unit GLU and the central processing unit CPU2 122 (#30). Then, according to the address previously set, the data of the RAM11 is transferred to the respective RAM1-RAM10 (#31). The data is transferred from the respective RAM1-RAM10 to the optical disk drives 11, 12 . . . , and is recorded in the data areas of optical disks 4 loaded in the respective disk drives.

Figure 8:
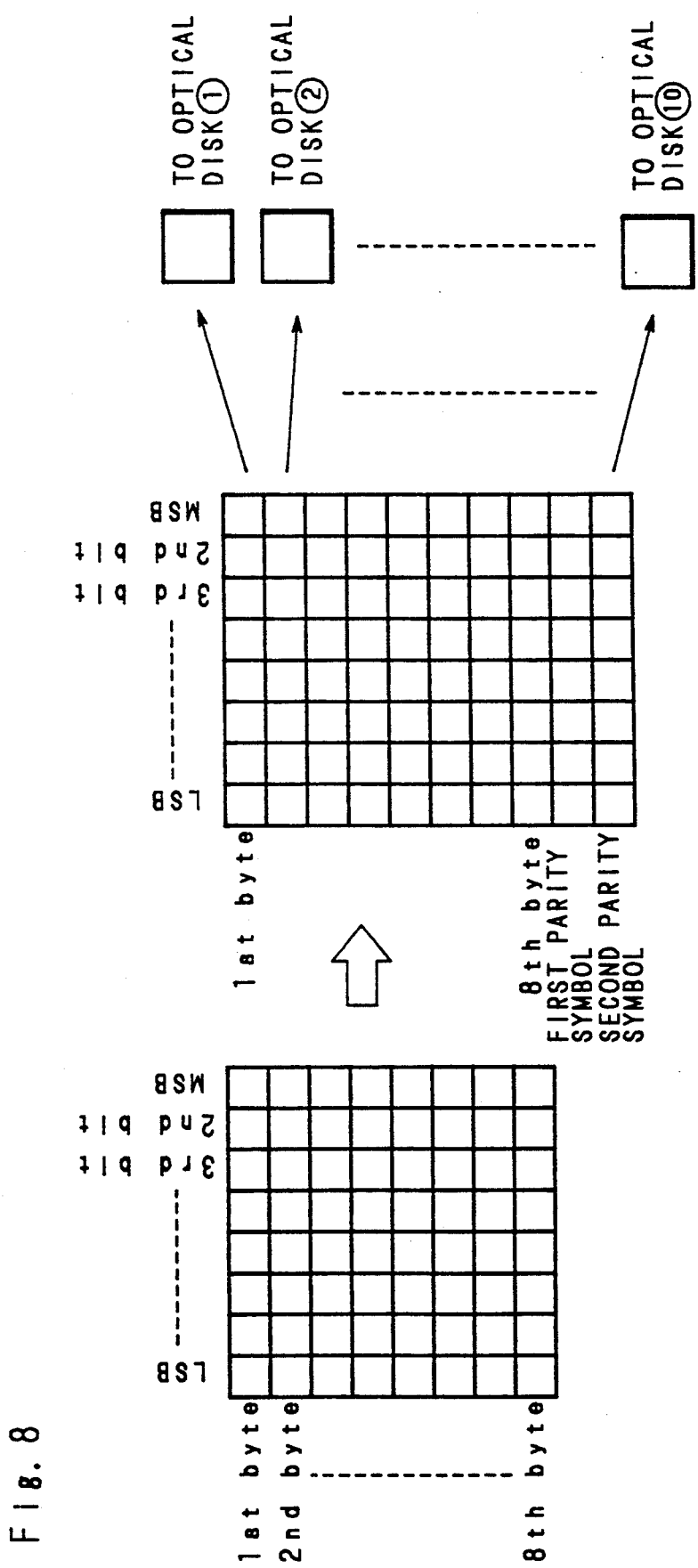
FIG. 8 is an explanatory drawing of data separation and recording.

FIG. 8 shows an example of another recording system, and as shown in FIG. 8(b), the first parity symbol and the second parity symbol are made from all bytes, and subsequently the first byte is sent to the optical disk drive loaded the optical disk of the number ①, the second byte is sent to the optical disk drive loaded the optical disk of the number ②, the first parity symbol is sent to the optical disk drive loaded the optical disk of the number ⑨, and the second parity symbol is sent to the optical disk drive loaded the optical disk of the number 10 . Needless to say, each of the bytes and symbols is recorded on each optical disk in each disk drive.

On the other hand, in reproduction, the original data is restored by the procedure reverse to the procedure of record as described above. This means that the data reproduced from the respective optical disk drives are arranged in association with the number of the optical disk loaded in each disk drive, and thereby the original data is obtained. Where the interleaving processing of the recording system in FIG. 5 or FIG. 8 is performed, the original data is obtained by the reverse logic. Then, in this data restoration, error correction by the Reed-Solomon code on GF ($2^8$) is performed.

Figure 9:
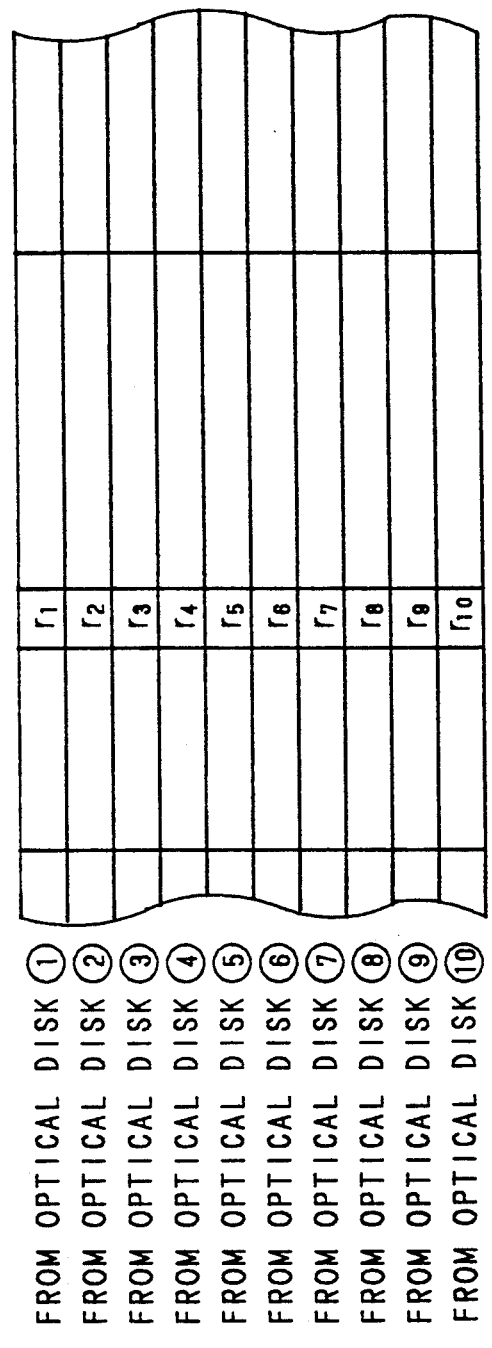
FIG. 9 is an explanatory drawing of reproduced data.

This means that, as shown in FIG. 9, taking data reproduced from the optical disks of the numbers 1, 2 . . . 9, 10 as $r_1, r_2, \ldots r_9, r_{10}$, syndromes $S_0, S_1$ are calculated from the following equations.

$$S_0 = \sum_{i=1}^{9} r_i$$

-continued
$$S_1 = \sum_{i=1}^{10} r_i \alpha_i \ (\alpha_{10} = 1)$$

Where no error exists, $S_0=S_1=0$ holds because of $r_i=a_i$, but where an error exists on the i-th optical disk, $S_0=0$ does not hold, and $S_0=e_i$ holds. Accordingly, when $S_1/S_0=\alpha_i$ is evaluated, since this $\alpha_i$ is a value peculiar to each optical disk, identifying and error correction of the appropriate optical disk can be performed. In addition, where $\alpha_i$ is a value other than the value allocated to each optical disk, it is assumed that errors are generated simultaneously on two or more optical disks, and error correction is not performed, and only a simultaneous generation of errors is detected. In addition, in this case, when one optical disk can be identified by an error pointer, erasure or the like, identification of the other optical disk, accordingly, error correction of the both optical disks can be performed.

Figure 10:
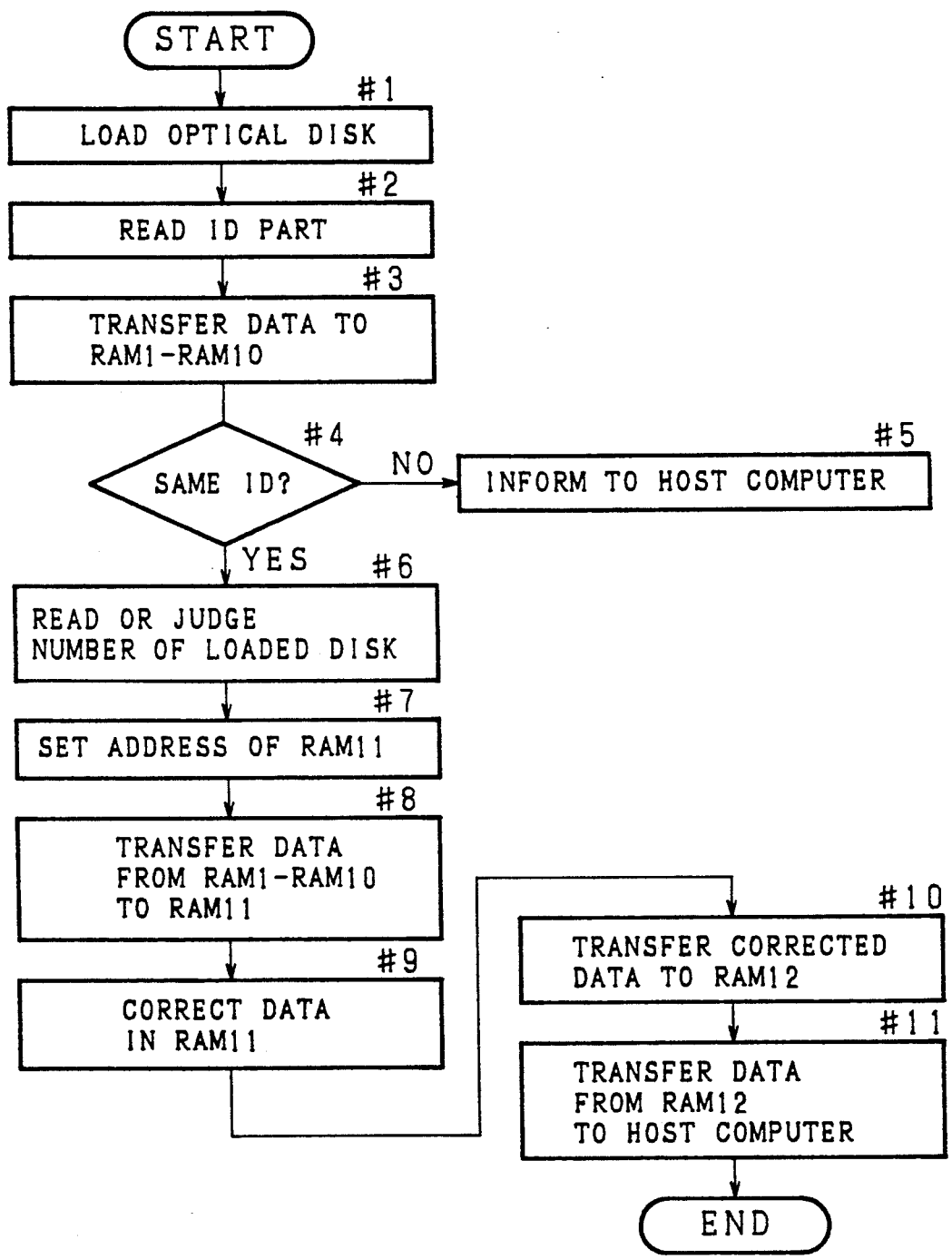
FIG. 10 is a flow chart showing processing procedures of data reproduction error correction.

FIG. 10 is a flow chart showing processing procedures of reproduction and error correction. When the optical disks 4 are loaded (#1), and the optical disk drives 11, 12 ... are driven, first, read of the ID part by the respective disk drives 11, 12 ... are performed (#2). These are transferred to the RAM1-RAM10 (#3). The central processing unit CPU1 checks this ID part (#4), and in the case of not being the same, it informs to the host computer 3 of this (#5). In the case of being the same, it reads or judges the numbers of the optical disks 4 loaded in the respective optical disk drives 11, 12 ... (#6). Reproduced data from 10 optical disk drives 11, 12 ... are stored respectively in the predetermined RAM1-RAM10, and the data stored in these RAM1-RAM10 are transferred to and stored in each area of the RAM11 allocated responding to the number of the optical disk. In Step #7, address setting for this purpose is performed. After such processing, the data reproduced by the respective optical disk drives 11, 12 ... are stored once in the RAM1-RAM10, being transferred from here to the set address of the RAM11 (#8). Then, the calculation as described above is performed by the central processing unit CPU2 122 and the Galois logic unit GLU, and when an error exists, correction thereof is performed (#9). Then, the corrected data or correct data is transferred to the RAM12 (#10), being further transferred to the host computer 3 through the interface 5 (#11). The host computer 3 has no relation with error correction, and the system operates with non-stop.

In the above example, each data is separated and recorded on the eight optical disk in a unit of byte, but can be recorded on separate optical disks in a unit of sector (760 bytes).

Figure 11A:
FIG. 11(a) and FIG. 11(b) are explanatory drawings of another data separation and recording system.
Figure 11B:
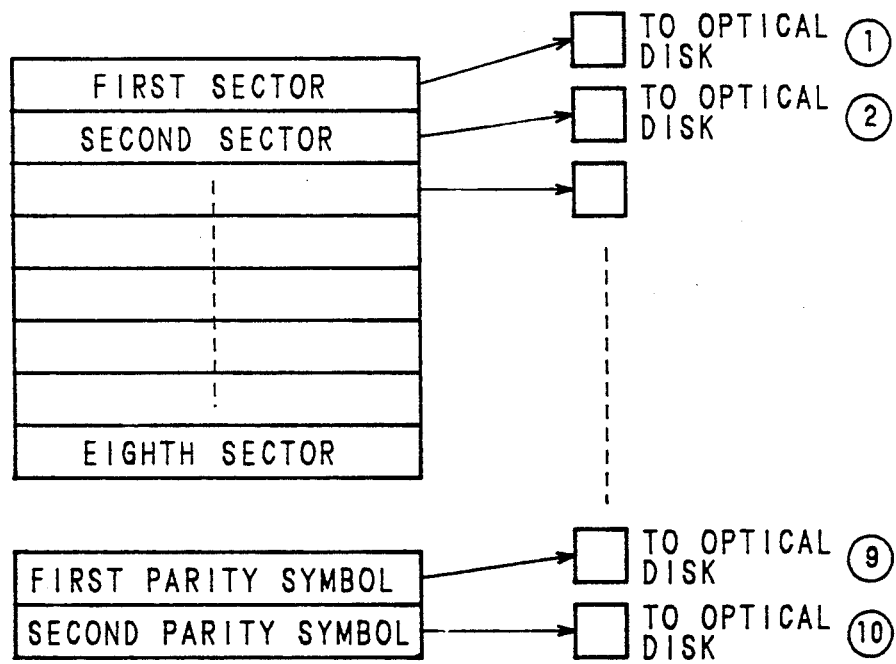

FIG. 11 is an explanatory drawing thereof. As shown in FIG. 11(b), the first parity symbol and the second parity symbol are made by arranging data from the first sector to the eighth sector as shown in FIG. 11(a). Where the error correction code to be used is, for example, GF ($2^8$), the data of the first byte of the parity symbol sector is made by combining the first bytes of the respective sectors. The parity symbol is made likewise for the subsequent bytes. The data from the first sector to the eighth sector and the first and the second parity symbols are recorded on the optical disk ①-the optical disk 10

The controlling apparatus 2 supervises whether or not the recording/reproducing operation of the optical disk drives 11, 12 ... and 20 is carried out normally. The supervising depends on one or a plurality of the followings; to detect whether or not normal replay signal to the controlling apparatus comes back from the optical disk drive, to detect a status signal which indicates the defects of the optical disk drives 11, 12 ... and 20, to calculate the number of sectors being impossible to reproduce to detect whether or not the number exceeds a predetermined standard, and the like.

In the case where a trouble of the optical disk drive is detected, there is a possibility that the data recording to the optical disk loaded in the optical disk drive is not carried out, or a wrong data recording is carried out. The system of the present invention makes the recording operation to be continued without stopping it. Then, in the worst case, recording is not carried out to the optical disk of the defective optical disk drive, while recording is properly carried out to the other optical disk. That is, a part of data to be recorded is to be erased.

In such a situation, information related to the erasure of the recorded data is to be recorded. The information of erasure is, to be concrete, a record of access related to the recording at the time of trouble, an address of an accessed sector and an address of an accessed track being cited. According to the former, restoring data by correcting error to be described later is carried out efficiently, since the former is exactly the record itself of the part related to the erasure of the data. But large capacity for storing the information of erasure is necessary. According to the latter, it requires more time to reproduce the data than the former by the time quantity in which the sector related to the erasure of the data is sought from the corresponding tracks, but there is no necessity for the capacity for storing the information of erasure to be large.

As a much easier way, there is a way in which a pointer is set on an accessed track. According to this way, the capacity for storing the information of erasure is the minimum and the time required for restoring the data is almost the same as in the case of storing the track address. In addition, for a system provided with a plurality of optical disk sets, it is necessary to store the information which specifies the set including the optical disk related to the erasure of the data.

Such information of erasure may be stored either in an optical disk or in a controlling apparatus 2. In the case where the information of erasure is recorded to optical disks, it may be separated and recorded, over a plurality of optical disks and the check data thereof is recorded to specified optical disks so as to cope with trouble of a part of the optical disk drives, in the same way as the original recording data, or it may be recorded to an optical disk being loaded in any of the normally operating optical disk drives.

In such a way, recording to optical disks is continued by the other optical disk drives with a part of the optical disk drive being in trouble and also afore-described recording of information of erasure is continued. On the other hand, the defected optical disk is repaired by being temporality separated from the system, or being left intact. By repairing or natural extinction of the trouble, the optical disk drive is restored to the original state.

Figure 12:
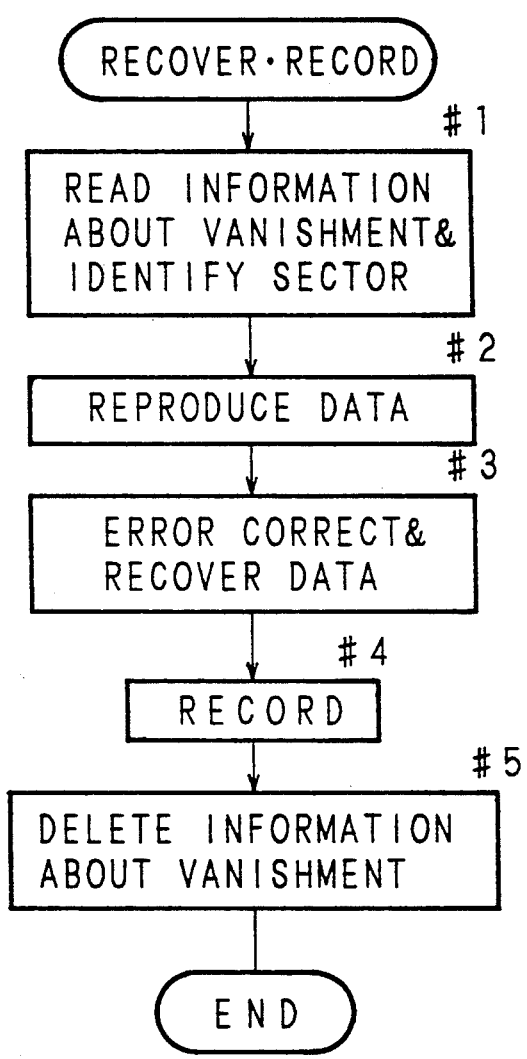
FIG. 12 is a flow chart of processing procedure for data recovery and re-record.

After restoring, making use of the spare time of recording/reproducing, restoration of the data which was to be recorded to the optical disk being loaded in the defected optical disk drive is carried out according to the error correction procedure shown in FIG. 12 and the restored data is recorded to aforesaid optical disk. In this error correction, reproducing the sector which has been accessed at the time of trouble of the optical disk drive is carried out on all of the disks (#1, 2). In the case where the sector address is stored, the reproduction is immediately possible, and in the case where the track address is stored, it is necessary to reproduce all of the sectors of the track to extract the data of the sector. In addition, in the case where only the pointer of the accessed track is stored, all of the sectors of the track where the pointer is set are reproduced to extract the data of required sector.

Error correction (#3) itself is carried out in the process shown in FIG. 10, and the data in RAM11 121 which has been error-corrected is modified to be recorded to the corresponding sector of all the optical disk (#4).

In this case, it is needless to say that the optical disk related to the erasure, whether it exists in any optical disk from ① to ⑧, or in the optical disk ⑨ or 10 recorded the check symbol, can be delt with equally.

In this way, every time the restoring and recording of data are carried out, the information of erasure related thereto is to be vanished (#5).

At the time of reproducing, if the reproduced data from any of the optical disk has incidental defect, it is error-corrected by the process shown in FIG. 10, and the controlling apparatus 2 sends the corrected normal data to the host computer 3.

On the other hand, in the case where an optical disk drive is in trouble and an incidentally defected reproduced data as afore-described is obtained from the optical disk being loaded in other optical disk drive, error-correction is possible when the number of optical disk being loaded in the defected optical disk drive is obtained as an erasure information, since the Hamming distance of the embodiment is 3. This error correction can be carried out after the fact that defected sector has come out of the normal optical disk drives is informed to the controlling apparatus 2 and the controlling apparatus 2 records the information of erasure on the basis of the information, then corresponding sector is accessed anew, by using the reproduced data and information of erasure of the defected optical disk drive (in this case, it is necessary to store the information which specifies the optical disk).

The information of defected sector and the number of the optical disk loaded in the defected optical disk drive are erasure informations for error-correction. Both data in the defected sector and said disk can be surely restored with the two erasure informations. The present invention, needless to say, can be applicable to a multi disk system with Hamming distance larger than 3 or a system with more than two disks on which check symbol is recorded.

Figure 13:
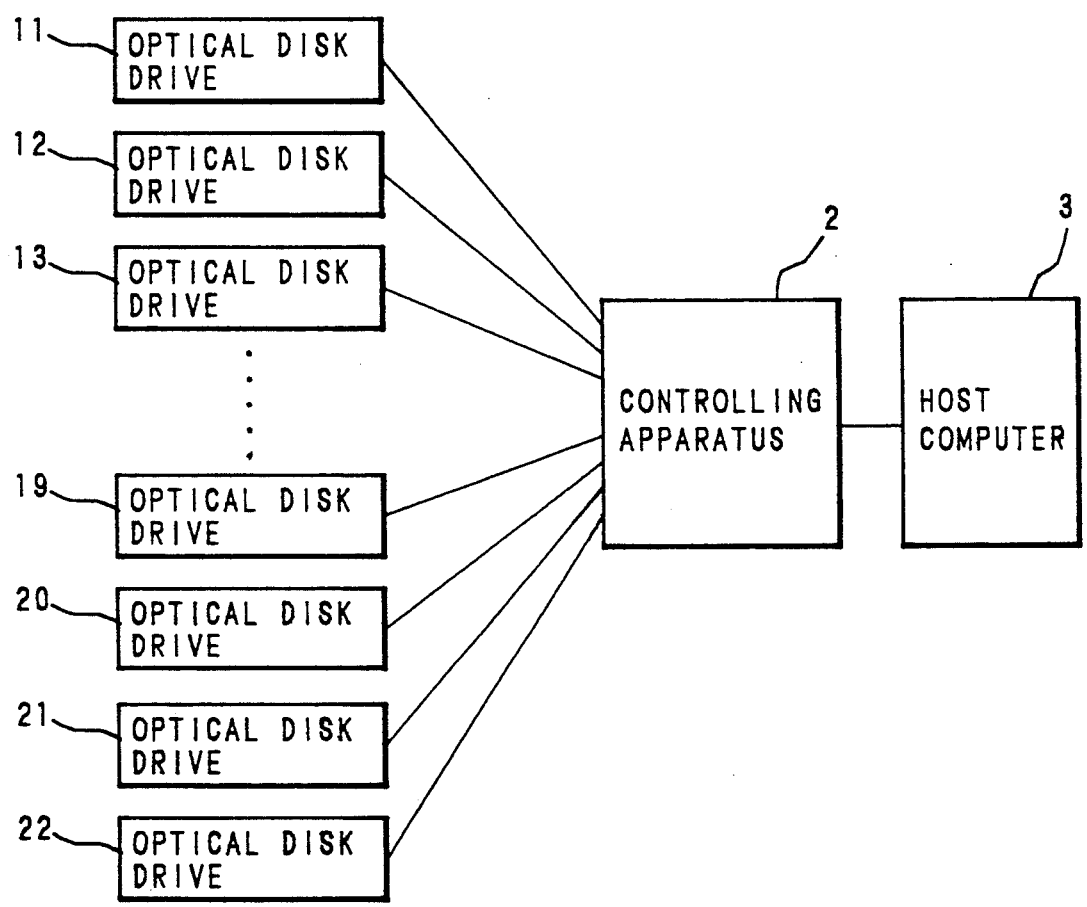
FIG. 13 is a block diagram of another embodiment of the optical recording system of the present invention.

FIG. 13 shows such an embodiment of the present invention, which is provided with 12 optical disk drives 11, 12, 13 . . . 19, 20, 21, 22, and uses the ninth, tenth, eleventh and twelfth optical disk 4, 4 . . . for recording check symbols of an error correction code. For example, as shown in FIG. 14, a series of data are divided into blocks, and the first-eighth blocks are recorded on the optical disks ①-⑧ and check symbols P, Q, R and S of an error correction code of a Hamming distance of 5 are recorded on the optical disks ⑨- 12. Similarly, the ninth-sixteenth blocks are recorded in the next area of each of the optical disks ①-⑧, and the check symbols P-S thereof are recorded in the next area of each of the optical disks ⑨- 12.

P, Q, R and S, that is, $a_9$, $a_{10}$, $a_{11}$ and $a_{12}$ are data meeting the following conditions.

$$\sum_{i=1}^{12} a_i = 0$$

$$\sum_{i=1}^{12} \alpha_i a_i = 0$$

$$\sum_{i=1}^{12} (\alpha_i)^2 a_i = 0$$

$$\sum_{i=1}^{12} (\alpha_i)^3 a_i = 0$$

Since $a_1$-$a_8$ are known data, $a_9$, $a_{10}$, $a_{11}$ and $a_{12}$ can be evaluated from four sums.

Figure 15:
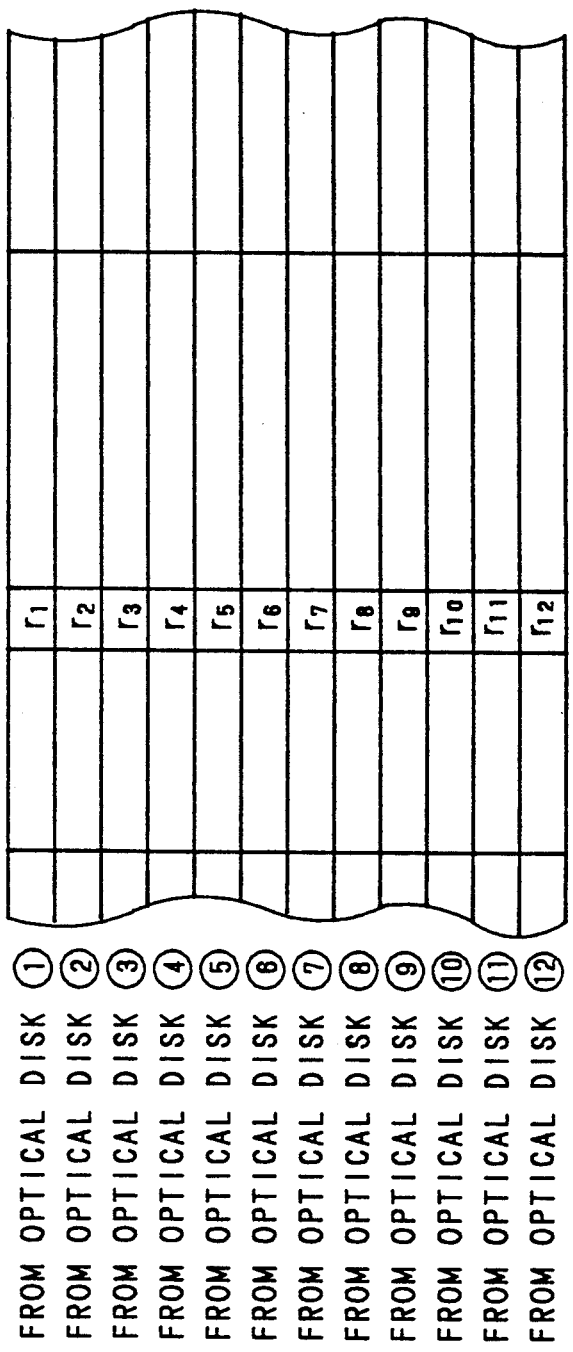
FIG. 15 is an explanatory drawing of reproduced data.

Next, for reproduction, as shown in FIG. 15, syndromes $S_0$, $S_1$, $S_2$ and $S_3$ are calculated for the data $r_1$-$r_{12}$ obtained from the optical disks.

$$S_0 = \sum_{i=1}^{12} r_i$$

$$S_1 = \sum_{i=1}^{12} \alpha_i r_i$$

$$S_2 = \sum_{i=1}^{12} (\alpha_i)^2 r_i$$

$$S_3 = \sum_{i=1}^{12} (\alpha_i)^3 r_i$$

Where no error exists, $r_i = a_i$ holds, therefore $S_0 = S_1 = S_2 = S_3 = 0$ holds, but, for example, if errors exist in disks ⓙ and ⓚ, the following equations hold.

$$S_0 = e_j + e_k$$

$$S_1 = \alpha_j e_j + \alpha_k e_k$$

$$S_2 = (\alpha_j)^2 e_j + (\alpha_k)^2 e_k$$

$$S_3 = (\alpha_j)^3 e_j + (\alpha_k)^3 e_k.$$

Four relational formulas exist for four unknown quantities $e_j$, $e_k$, $\alpha_j$ and $\alpha_k$, and therefore they can be solved using the well known algorithm. Thereby, identification and error correction of j and k are made possible.

This means that, unlike the embodiment in FIG. 1, where check symbols of a Hamming distances of 5 are recorded on four optical disks, troubles of two optical disks or two optical disk drives can be accommodated for, and where an error pointer or an erasure are provided, or the troubled optical disk is identified, troubles of three optical disks can be accommodated for.

Next, explanation is given on an exchanging unit for an optical disk in the system of the present invention.

Figure 16:
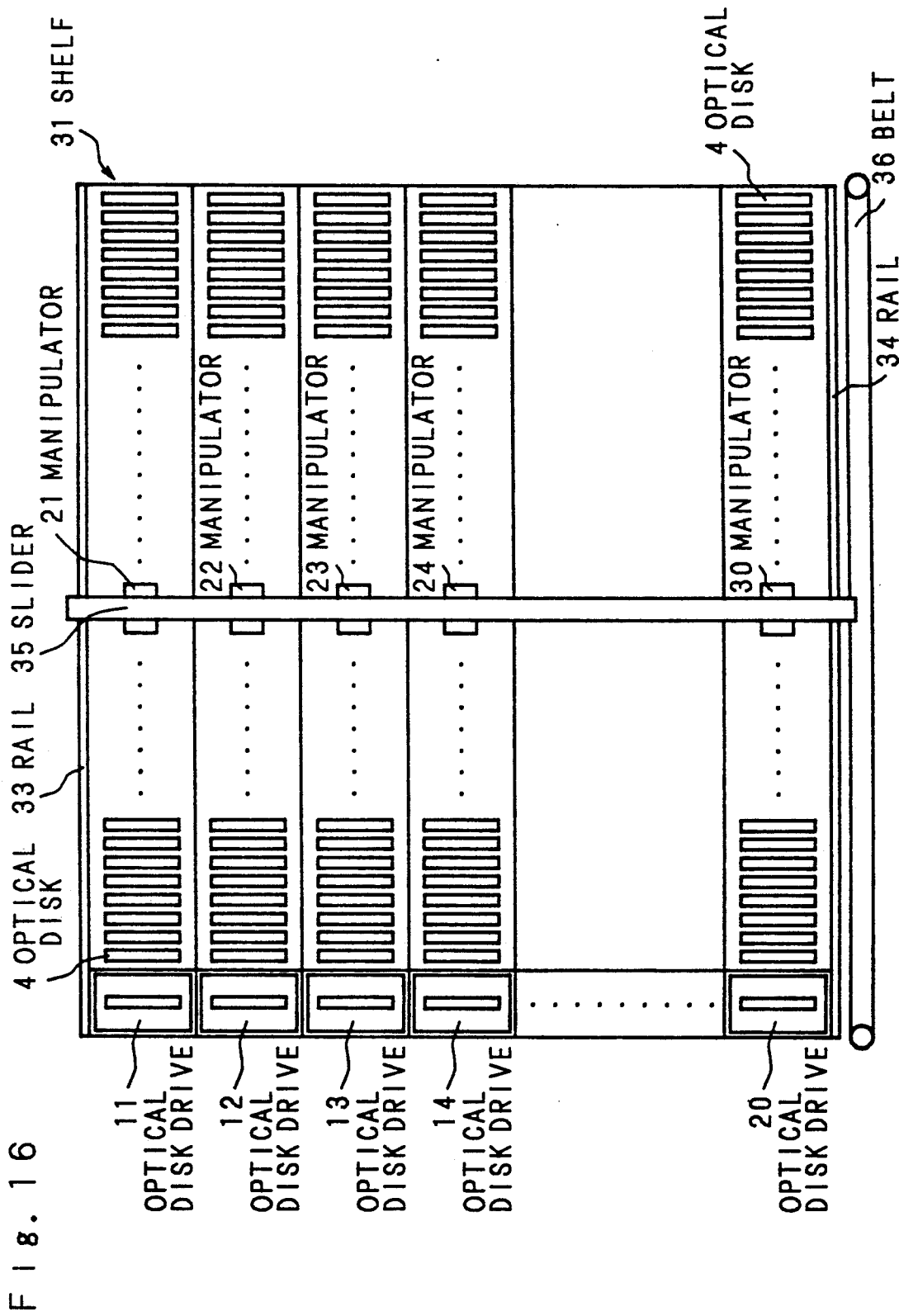
FIG. 16 is a schematic front view of a changer.

FIG. 16 is a schematic elevation view of an exchanging unit showing both optical disk drives and housing shelf. Ten (n=10) optical disk drives 11, 12 . . . are placed in juxtaposition in the height direction, and on one side portion thereof, there is provided a shelf 31 of ten stages and m files, with m number sets of ten optical disks being housed in ten stages of each file of the shelf. At both top and bottom positions of these optical disk drives 11, 12 ... and the shelf 31, rails 33 and 34 are laid down, a slider 35, which extends from the rail 33 to the rail 34, being slidably provided against the rails 33 and 34. Under the lower side of the rail 34 being at the bottom position, a belt 36 is provided which moves horizontally in parallel with the rail 34. The lower end of the slider 35 is connected to the belt 36, and by the movement of the belt 36, the slider 35 is capable of moving to the front of optical file of the shelf 31 or to optical disk drive 11, 12 ....

Figure 17:
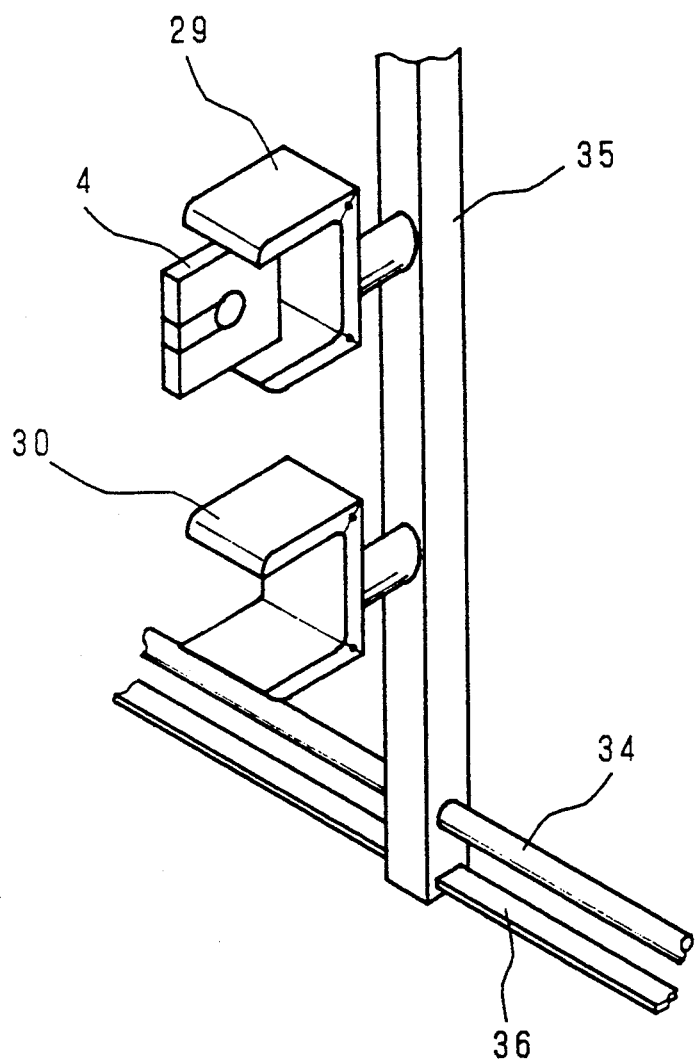
FIG. 17 is a perspective view of a part thereof.

At the slider 35, ten manipulators 21, 22 ... and 30 are provided corresponding to the stages of the shelf or the optical disk drives 11, 12 .... The manipulators 21, 22 ..., as shown in FIG. 17, are respectively comprised of the trunk portions which move back and forth from the slider 35 and of the branch portions which hold the optical disks 4 therebetween or release them, so as to house the optical disks (as shown in the figure, each being stored in a flat and rectangular cartridge) in the shelf 31 or to take them out therefrom, or so as to load them in the optical disk drives 11, 12 ... or to take them out therefrom.

In such an exchanging unit, the belt 36 is driven to position the slider 35 in front of the required file of the shelf, the manipulators 21, 22 ... are driven to take out the ten optical disks 4 housed in the same file, and the belt 36 is moved further to be positioned in front of the optical disk drives 11, 12 ..., hereupon the manipulators 21, 22 ... being driven to load the optical disks 4 in the optical disk drives 11, 12 .... In the case where the loaded optical disks 4 are exchanged, contrary to the afore-described case, optical disks 4 are taken out of the optical disk drives 11, 12 ... to be returned to the home file of the shelf, and the optical disks 4 in other file of the shelf are taken out to be loaded in the optical disk drives 11, 12 ....

As the recording/reproducing of data is carried out with ten optical disks 4 being as a unit, the exchange thereof is also carried out with ten optical disks 4 as a unit. In the afore-described recording system, two optical disks of the ten-in-a-set optical disks are for exclusive use of check symbol. In this case, when one optical disk 4 is in trouble, the data thereof can be reproduced by using other nine optical disks 4. In addition, in the case where two optical disks are in trouble, the data thereof can be reproduced if the erasure information, about one of the two optical disks, that which optical disk is in trouble is obtained.

Accordingly, the data can be reproduced not only in the case where the optical disk itself is lost or broken, but in the case where recording/reproducing cannot be done because one or two optical disk drives are in trouble, or in the case where the optical disks cannot be loaded in the optical disk drives 11, 12 ... because one or two of the manipulators 21, 22 ... are in trouble as well.

At the time of recording, data is recorded only to the optical disks 4 being loaded in eight or nine optical disk drives 11, 12 .... After the trouble is settled, the data recorded in other optical disks is reproduced, then the data to be recorded to the remaining optical disks is reproduced to be recorded.

The system is highly reliable, however, in the case where the driving system of the slider 35 is in trouble, even only an optical disk 4 cannot be loaded or exchanged, resulting in a fatal trouble.

Figure 18:
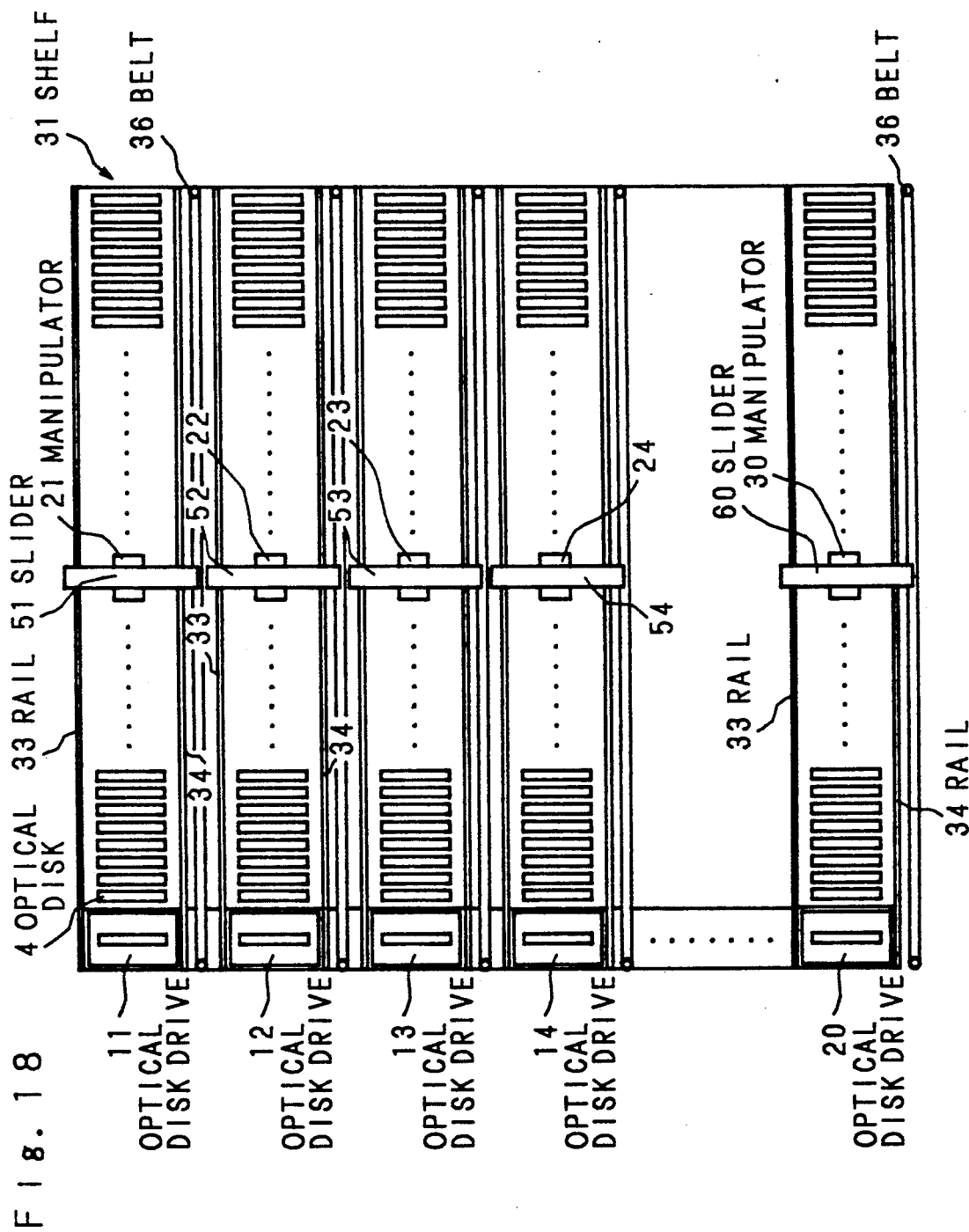
FIG. 18 is a schematic front view of another changer.

FIG. 18 is a schematic elevation view of improved exchanging apparatus. At both top and bottom of each stage of the shelf 31 of ten (=n) stages and m files, rails 33 and 34 are respectively provided horizontally, and between the rails 33 and 34, individual sliders 51, 52 .. . and 60 are slidably provided. At the belts 36, 36 ... provided in close vicinity to the lower side rail 34 of each stage being in parallel therewith, the lower ends of the sliders 51, 52 ... and 60 are connected, and by the movement of the belts, the sliders 51, 52 ... and 60 can move in front of the optical file of the shelf 31 or in front of the optical disk drives 11, 11, ... and 20. At each of the sliders 51, 52 ... and 60, the manipulators 21, 22 .. . and 30 are provided which pick up the optical disks 4 and move back and forth so as to get close to or go away from the shelf 31 or the optical disk drives 11, 12 ... and 20. The manipulator itself is the same one as shown in FIG. 13.

The operation of the exchanging unit as the above is as follows.

At first, an information about the set of the optical disks 4 to be loaded in the optical disk drives 11, 12 ... or an information specifying the required data is given to the controlling apparatus 2 from the host computer 3. Then the controlling apparatus 2 drives the belts 36, 36 ... to position the sliders 51, 52 ... in front of the file of the shelf housing optical disks 4 to be loaded. Subsequently the controlling apparatus drives the manipulator 21, 22 ... to take out the optical disk 4 in the file. The manipulators go forth, holds the optical disks 4, and go back.

Next, the controlling apparatus 2 drives the slider 51, 52 ... to be positioned in front of the optical disk drives 11, 12 ... and drives the manipulators 21, 22 ... in order to load the optical disks in the optical disk drives. The manipulators 21, 22 ... go forth, release the optical disks, and go back. Thereby, required set of the optical disks 4, 4 ... are loaded in the optical disk drives 11, 12 ... and 20.

In addition, in the case where the optical disks 4, 4 . . . are already loaded in the optical disk drives 11, 12 .. . and 20, prior to the afore-described loading, optical disks 4, 4 ... in the optical disk drive 11, 12 ... are returned to the home file of the shelf. In other words, as the controlling apparatus 2 has an information that whether or not the optical disk 4, 4 ... are loaded in each of the optical disk drives 11, 12 ..., it makes the sliders 51, 52 ... move to be positioned in front of the optical disk drives 11, 12 ... on the basis of the information, and makes the manipulators 21, 22 ... go forth, hold the optical disks, and go back, then makes the sliders 51, 52 ... move to store the picked up optical disks 4 in the file of the shelf (which the controlling apparatus 2 memorizes), and makes the manipulators 21, 22 ... go forth, release the optical disks, and go back.

In addition, in order that such a controlling is carried out, various kinds of sensors such as a detecting unit which detects the position in the horizontal direction of the shelf 31 of each sliders 51, 52 ... and 60, detecting means which detects the limit of the operation of the manipulators 21, 22 ..., and the like are required, the signals of these sensors being given to the controlling apparatus 2.

When the controlling apparatus 2 drive the optical disk drives 11, 12 ... in such a way, it reads out the contents of the file name recording area 4a, the number recording area 4b, and the record form identifying area 4c. The host computer 3 judges whether or not the optical disks are loaded as instructed according to the contents of the file name recording area 4a.

In such an exchanging unit, recording/reproducing is possible even if either of the sliders is in trouble, leading to highly reliable system as a whole.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims, or equivalence of such meets and bounds thereof are therefore intended to be embraced by the claims.

What is claimed is:

1. An optical recording system comprising:
    a plurality of optical disk drives, each for being loaded with an optical disk;
    a control apparatus, coupled to said plurality of disk drives, for controlling recording of information on and reproducing information from the optical disks, said control apparatus including;
    means for separating data to be recorded into a plurality of data segments and recording each data segment on a separate optical disk;
    means for generating a check symbol of an error correction code for the data to be recorded;
    means for recording said check symbol on at least one optical disk that differs from the optical disks upon which the data segments are recorded;
    means for detecting trouble with the plurality of optical disk drives and for identifying the disk drives that are the source of the trouble; and
    means for storing accessing information about data that was to be recorded to the disk drives identified as the source of trouble, said accessing information being stored within either of said control apparatus and the disk drives not identified as having trouble.

2. An optical recording system as set forth in claim 1, wherein said error correction code is the Reed-Solomon code.

3. An optical recording system as set forth in claim 1, wherein said check symbol has a Hamming distance n of at least 3 and the check symbol is recorded on a number of optical disks equal to n−1.

4. An optical recording system as set forth in claim 3, wherein n=3.

5. An optical recording system as set forth in claim 3, wherein n=5.

6. An optical recording system as set forth in claim 1, wherein said accessing information includes the sector addresses of the data to be recorded to the optical disk drives with trouble.

7. An optical recording system as set forth in claim 1, wherein said accessing information includes the track addresses of the data to be recorded to the optical disk drives with trouble.

8. An optical recording system as set forth in claim 1, wherein said information is recorded on an optical disk.

9. An optical recording system as set forth in claim 1, wherein said information is stored in said control apparatus.

10. An optical recording system comprising:
    a plurality of optical disk drives, each for being loaded with an optical disk;
    a control apparatus, coupled to said plurality of disk drives, for controlling recording of information on and reproducing information from the optical disks, said control apparatus including;
    means for separating data to be recorded into a plurality of data segments and recording each data segment on a separate optical disk;
    means for generating a check symbol of an error correction code for the data to be recorded;
    means for recording said check symbol on at least one optical disk that differs from the optical disks upon which the data segments are recorded;
    means for detecting trouble with the plurality of optical disk drives and for identifying the disk drives that are the source of the trouble;
    means for storing accessing information about data that was to be recorded to the disk drives identified as the source of trouble, said accessing information being stored within either of said control apparatus and the disk drives not identified as having trouble;
    means for correcting errors in data recovered from optical disks loaded in the optical disk drives identified as the source of the trouble by utilizing said check symbol.

11. An optical recording system as set forth in claim 10, wherein said error correction code is the Reed-Solomon code.

12. An optical recording system as set forth in claim 10, wherein said check symbol has a Hamming distance n of at least 3 and the check symbol is recorded on a number of optical disks equal to n−1.

13. An optical recording system as set forth in claim 12, wherein n=3.

14. An optical recording system as set forth in claim 12, wherein n=5.

15. An optical recording system as set forth in claim 10, wherein said accessing information includes the sector addresses of the data to be recorded to the optical disk drives with trouble.

16. An optical recording system as set forth in claim 10, wherein said accessing information includes the track addresses of the data to be recorded to the optical disk drives with trouble.

17. An optical recording system as set forth in claim 10, wherein said means for storing accessing information includes means for setting a point responsive to the track addresses of the data to be written to the disk drives with trouble.

18. An optical recording system as set forth in claim 10, wherein said information is recorded on an optical disk.

19. An optical recording system as set forth in claim 10, wherein said information is stored in said control apparatus.

20. A method of recording data to and recovering data from a plurality of optical disks loaded within a corresponding plurality of disk drives, the method comprising the steps of:
    separating data to be recorded into a plurality of data segments;
    generating a check symbol of an error correction code for the data to be recorded;
    recording each data segment on a separate optical disk;
    recording said check symbol on at least one optical disk that differs from the optical disks upon which the data segments are recorded;
    detecting trouble with the plurality of optical disk drives;
    identifying the disk drives that are the source of the trouble; and storing accessing information about data that was to be recorded to the disk drives identified as the source of trouble, said accessing information being stored within either of said control apparatus and the disk drives not identified as having trouble.

21. A method of recording data to and recovering data from a plurality of optical disks loaded within a corresponding plurality of disk drives as recited in claim 20 wherein the step of generating a check symbol of an error correction code includes generating a check symbol for the Reed-Solomon code.

22. A method of recording data to and recovering data from a plurality of optical disks loaded within a corresponding plurality of disk drives as recited in claim 20 wherein:
   the step of generating a check symbol of an error correction code includes generating a check symbol with a Hamming distance n of at least 3; and
   the step of recording said check symbol includes recording said check symbol on a number of optical disks equal to $n-1$.

23. A method of recording data to and recovering data from a plurality of optical disks loaded within a corresponding plurality of disk drives as recited in claim 20 wherein the step of storing accessing information includes storing the sector addresses of the data to be recorded to the optical disk drives with trouble.

24. A method of recording data to and recovering data from a plurality of optical disks loaded within a corresponding plurality of disk drives as recited in claim 20 wherein the step of storing accessing information includes storing the track addresses of the data to be recorded to the optical disk drives with trouble.

25. A method of recording data to and recovering data from a plurality of optical disks loaded within a corresponding plurality of disk drives as recited in claim 20 wherein the step of storing accessing information includes setting a pointer responsive to the track addresses of the data to be recorded to the optical disk drives with trouble.

26. A method of recording data to and recovering data from a plurality of optical disks loaded within a corresponding plurality of disk drives as recited in claim 20 wherein the step of storing accessing information includes storing the accessing information to a disk drive not identified as having trouble.

27. A method of recording data to and recovering data from a plurality of optical disks loaded within a corresponding plurality of disk drives as recited in claim 21 wherein the step of storing accessing information includes storing the accessing information to a control apparatus.

28. A method of recording data to and recovering data from a plurality of optical disks loaded within a corresponding plurality of disk drives as recited in claim 20 further comprising the steps of:
   recovering data recorded on the plurality of optical disks; and
   correcting errors in data that was to be recorded to the disk drives identified as having trouble by utilizing said check symbol.

* * * * *